Patented May 2, 1933

1,906,232

UNITED STATES PATENT OFFICE

MAX LANGE, OF FRANKFORT-ON-THE-MAIN-HOCHST, WILHELM LUCE, OF HOFHEIM-ON-TAUNUS, AND THEO JACOBS, OF WIESBADEN, GERMANY, ASSIGNORS TO GENERAL ANILINE WORKS, INC., OF NEW YORK, N. Y., A CORPORATION OF DELAWARE

HALOGEN SUBSTITUTION PRODUCTS OF 2-HYDROXYNAPHTHALENE-3-CARBOXYLIC ACID AND PROCESS OF PREPARING THEM

No Drawing. Application filed April 4, 1932, Serial No. 603,212, and in Germany April 9, 1931.

This invention relates to the manufacture of halogen substitution products of 2-hydroxynaphthalene-3-carboxylic acid and to new products obtainable thereby, more particularly it relates to a process which comprises subjecting an alkali metal salt of a beta-naphthol compound, being substituted in the non-hydroxylated nucleus by chlorine or bromine, to the action of carbon dioxide at an elevated temperature, preferably under superatmospheric pressure and at a temperature ranging from about 200° C. to about 300° C.

The new products obtainable by the above process may be defined by the general formula:

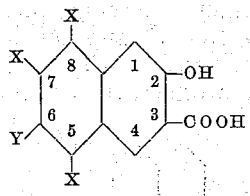

wherein one of the X's stands for chlorine or bromine and Y and the other X's represent hydrogen, or Y stands for chlorine and the X's for hydrogen.

The halogenated 2-hydroxynaphthalene-3-carboxylic acids are valuable intermediates for the manufacture of dyestuffs or dyestuff components.

It is known in the art that alkali metal salts of beta-naphthol, when treated with carbon dioxide under suitable conditions, yield 2-hydroxynaphthalene-3-carboxylic acid (compare, for instance, U. S. Patent No. 1,725,394).

It is, however, surprising that the chloro- and bromo-2-hydroxynaphthalenes are capable of undergoing the rather rough and strong treatment without being decomposed. It had to be expected that at least the halogen would be eliminated during the severe reaction conditions which are necessary for carrying out the present process.

In carrying out the process, it is advantageous to dehydrate the alkali metal salts of the halogenated beta-naphthols before causing carbon dioxide to react with the salts. The production of the alkali metal salts is performed according to known methods; for example, chlorinated or brominated beta-naphthol and the required amount of aqueous caustic soda or caustic potash solution are mixed and the salts thus formed are evaporated to dryness and dehydrated under suitable conditions.

In order to bring the carbon dioxide in close contact with the naphtholates, the reaction mass is well agitated during the reaction.

The following examples serve to illustrate the invention but they are not intended to limit it thereto, the parts being by weight:

(1) 178.5 parts of 7-chloro-2-naphthol are converted in known manner into the sodium salt. The salt which has been cautiously dehydrated is treated, while well agitating, with carbon dioxide under a pressure of about 45 atmospheres and at a temperature of about 230° C. The temperature is raised to about 250° C. and stirring is continued until no more carbon dioxide is absorbed. The 7-chloro-2-hydroxy-naphthalene-3-carboxylic acid which has been formed, is isolated from the reaction product in the usual manner. It crystallizes from glacial acetic acid in the form of yellowish shining laminæ, melting at 277° C.–278° C.

(2) The sodium salt of 6-chloro-2-naphthol is dehydrated in vacuo at about 200° C. and treated under pressure with carbon dioxide as indicated in Example 1. There is obtained a mixture of 6-chloro-2-hydroxynaphthalene-3-carboxylic acid and 6-chloro-2-hydroxynaphthalene-1-carboxylic acid which is separated from the unchanged 6-chloro-2-naphthol in the usual manner.

In order to isolate from the mixture of the two carboxylic acids the 6-chloro-2-hydroxynaphthalene-3-carboxylic acid, the 6-chloro-2-hydroxy-1-carboxylic acid is retransformed into 6-chloro-2-naphthol. To this end, the crude mixture of the two carboxylic acids is heated to 200° C. until no more carbon dioxide is evolved and, thereupon, dissolved in caustic soda solution. The solution thus obtained is exactly neutralized and the 6-chloro-2-naphthol which separates, is filtered with suction. On acidifying the filtrate, 6-chloro-2-hydroxynaphthalene-3-carboxylic acid precipitates. It crystallizes from glacial acetic acid in the form of yellow laminæ, melting at 260° C.

(3) The sodium salt of 8-chloro-2-naphthol is treated with carbon dioxide under a pressure of about 150 atmospheres and at a temperature of about 250° C. The 8-chloro-2-hydroxynaphthalene-3-carboxylic acid thus formed is isolated in the usual manner from unchanged 8-chloro-2-naphthol which may still be present. The new acid dissolves in boiling benzene and crystallizes from benzene in the form of feebly yellow-colored needles, melting at 250° C.

In an analogous manner there may be obtained from 5-chloro-2-naphthol 5 chloro-2-hydroxynaphthalene-3-carboxylic acid.

(4) Instead of the chloro-2-naphthols used in the preceding examples there may be treated with carbon dioxide under analogous conditions the corresponding bromo-2-naphthols. Thus, for instance, the sodium salt of 7-bromo-2-naphthol is treated with carbon dioxide under a pressure of about 120 atmospheres and at a temperature of about 240° C. The temperature is raised to about 260° C. and maintained until the manometer indicates no further absorption of carbon dioxide. The 7-bromo-2-hydroxynaphthalene-3-carboxylic acid, thus obtained and isolated in the usual manner, melts, after recrystallization from glacial acetic acid at 265° C.–266° C.

(5) By using in the above examples instead of the sodium salts the corresponding potassium salts and proceeding as indicated in these examples, there are likewise obtained carboxylic acids.

We claim:

1. The process which comprises subjecting an alkali metal salt of a beta-naphthol compound, being substituted in the non-hydroxylated nucleus by a substituent of the group consisting of chlorine and bromine, to the action of carbon dioxide, while heating.

2. The process which comprises subjecting an alkali metal salt of a beta-naphthol compound, being substituted in the non-hydroxylated nucleus by a substituent of the group consisting of chlorine and bromine, to the action of carbon dioxide, under superatmospheric pressure and at a temperature ranging from about 200° C. to about 300° C.

3. The process which comprises subjecting a sodium salt of a beta-naphthol compound, being substituted in the non-hydroxylated nucleus by a substituent of the group consisting of chlorine and bromine, to the action of carbon dioxide under superatmospheric pressure and at a temperature ranging from about 200° C. to about 300° C.

4. The process which comprises subjecting the sodium salt of 7-chloro-2-naphthol to the action of carbon dioxide under a pressure of about 45 atmospheres first at about 230° C. and then at about 250° C., until no more carbon dioxide is absorbed.

5. The process which comprises subjecting the sodium salt of 8-chloro-2-naphthol to the action of carbon dioxide under a pressure of about 150 atmospheres and at a temperature of about 250° C., until no more carbon dioxide is absorbed.

6. As new products, the compounds of the general formula:

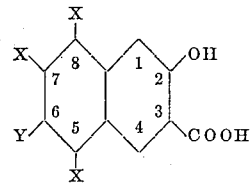

wherein one of the X's stands for chlorine or bromine and Y and the other X's represent hydrogen, or Y stands for chlorine and the X's for hydrogen.

7. As new products, the compounds of the formula:

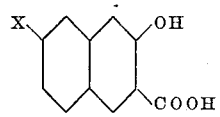

wherein X stands for chlorine or bromine the chloro compound having a melting point of 277° C. to 278° C. and the bromo compound of 265° C. to 266° C.

8. As a new product, the compound of the formula:

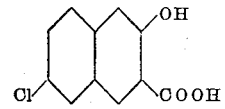

crystallizing from glacial acetic acid in the form of yellowish leaflets, melting at 260° C.

9. As a new product, the compound of the formula:

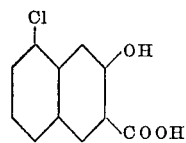

crystallizing from benzene in the form of weakly yellowish-colored needles, melting at 250° C.

In testimony whereof, we affix our signatures.

MAX LANGE.
WILHELM LUCE.
THEO JACOBS.